(12) United States Patent
Kindt et al.

(10) Patent No.: US 6,348,681 B1
(45) Date of Patent: Feb. 19, 2002

(54) METHOD AND CIRCUIT FOR SETTING BREAKPOINTS FOR ACTIVE PIXEL SENSOR CELL TO ACHIEVE PIECEWISE LINEAR TRANSFER FUNCTION

(75) Inventors: Willem Johannes Kindt, Sunnyvale; Brian Segerstedt, San Mateo; Christina Phan, San Jose, all of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 17 days.

(21) Appl. No.: 09/586,838

(22) Filed: Jun. 5, 2000

(51) Int. Cl.[7] .............................................. H01L 31/062
(52) U.S. Cl. .............................. 250/208.1; 250/214 A; 348/308; 348/301
(58) Field of Search .......................... 250/208.1, 214 A; 348/301, 308

(56) References Cited

U.S. PATENT DOCUMENTS

| | | | |
|---|---|---|---|
| 4,809,075 A | * 2/1989 | Akimoto et al. ............ 348/301 |
| 5,055,667 A | 10/1991 | Sayag ...................... 250/208.1 |
| 5,268,567 A | 12/1993 | Bowlby, Jr. et al. ...... 250/208.1 |
| 5,283,426 A | 2/1994 | Bowlby, Jr. et al. ...... 250/208.1 |
| 5,872,596 A | 2/1999 | Yanai et al. ................. 348/297 |
| 6,008,486 A | * 12/1999 | Stam et al. ............... 250/208.1 |
| 6,040,570 A | 3/2000 | Levine et al. ............. 250/208.1 |
| 6,130,713 A | * 10/2000 | Merrill ....................... 348/308 |
| 6,246,043 B1 | * 6/2001 | Merrill ..................... 250/208.1 |
| 6,248,991 B1 | * 6/2001 | Chen et al. .............. 250/208.1 |

OTHER PUBLICATIONS

Decker, et al., A 256 × 256 CMOS Imaging Array with Wide Dynamic Range Pixels and Column–Parallel Digital Output, *IEEE Journal of Solid–State Circuits*, vol. 33, No. 12, Dec. 1998, pp. 2081–2091.

* cited by examiner

*Primary Examiner*—Robert H. Kim
*Assistant Examiner*—Glen Kao
(74) *Attorney, Agent, or Firm*—Girard & Equitz LLP (57) ABSTRACT

An active pixel sensor cell array including a XDR reset signal generation circuit configured to generate XDR reset signals having user-selected levels, and an XDR reset signal generation circuit for use with such an array. The XDR reset signal generation circuit includes a digital-to-analog converter (DAC) coupled to receive control bits which determine the level and time of assertion of each XDR reset signal, and a level shifting circuit coupled to the output of the DAC. In response to the control bits (typically a sequence of multi-bit words), the circuit asserts a time-varying XDR reset potential. The XDR reset potential's amplitude as function of time (during each integration period) determines the breakpoints of each cell's response curve. The level shifting circuit includes a reference transistor, whose current density matches that of the reset transistors inside the cells, which shifts the potential at the DAC's output upward by an amount equal to the reference transistor's threshold voltage (which matches the threshold voltage of each reset transistor of the cell array or a row of the cell array) to produce the XDR reset potential. To cause the control bits asserted to the DAC to establish breakpoints which in turn cause the analog-to-digital converter (ADC) of the image sensor array to assert (predictably) an expected set of digital output bits in response to each read of a cell exposed to light of known intensity, both the ADC and the DAC operate at the same reference voltage, and the level shifting circuit's reference transistor's biasing matches that of the reset transistors inside the cells.

21 Claims, 5 Drawing Sheets

METHOD AND CIRCUIT FOR SETTING BREAKPOINTS FOR ACTIVE PIXEL SENSOR CELL TO ACHIEVE PIECEWISE LINEAR TRANSFER FUNCTION

FIELD OF THE INVENTION

The present invention pertains to generation of control signals for an active pixel sensor cell array. More particularly, the invention pertains to methods and circuitry for generating "extended dynamic range" (XDR) reset pulses for causing each cell of an active pixel sensor cell array to operate with a piecewise linear transfer function.

DESCRIPTION OF THE RELATED ART

Charge-coupled devices (CCDs) have been the mainstay of conventional imaging circuits for converting photons incident at individual pixel sensor cells (of a pixel sensor cell array) into electrical signals indicative of the intensity of light energy incident at each cell. In general, a CCD uses a photogate to convert light energy incident at a cell into an electrical charge, and a series of electrodes to transfer the charge collected at the photogate to an output sense node.

Although CCDs have many strengths, including high sensitivity and fill-factor, CCDs also suffer from a number of weaknesses. These weaknesses include limited readout rates and dynamic range limitations, and notably, the difficulty in integrating CCDs with CMOS-based microprocessors.

The expression "dynamic range" is used herein to denote the ratio of maximum detectable signal magnitude to minimum detectable signal magnitude. The present invention increases dynamic range of an active pixel sensor cell by increasing the maximum magnitude of the signal it can detect.

To overcome the limitations of CCD-based imaging circuits, imaging circuits have been developed which use active pixel sensor cells to convert light energy into electrical signals. An active pixel sensor cell typically includes a photodiode and a number of transistors which provide amplification, readout control, and reset control in addition to producing the electrical signal output from the cell.

Figure 1:
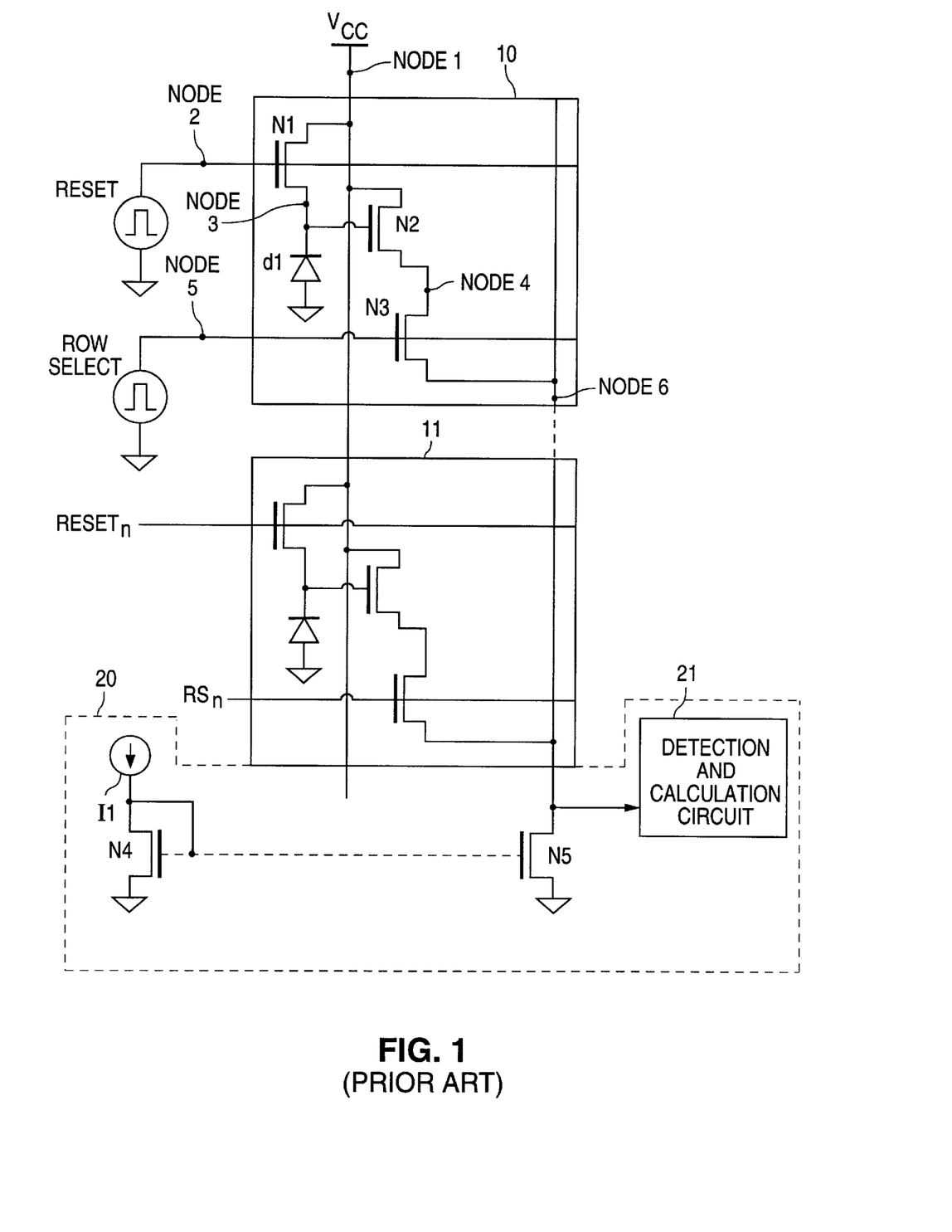
FIG. 1 is a schematic diagram of two CMOS active pixel sensor cells (having conventional design) connected along a column of an active pixel sensor cell array, and circuitry for use in reading all cells connected along the column.

FIG. 1 is an example of two identical CMOS active pixel sensor cells (10 and 11) having conventional design, connected along a column of an active pixel sensor cell array, and circuitry 20 for use in reading all cells connected along the column (and other columns not shown). As shown in FIG. 1, cell 10 includes photodiode d1 (connected as shown between ground and Node 3), and reset transistor N1. Transistor N1 is an NMOS transistor whose drain is connected to a power supply node (Node 1) maintained at potential Vcc, whose source is connected to Node 3, and whose gate is connected to Node 2. The gate of transistor N1 is controlled (in a manner to be described below) by a RESET signal supplied to Node 2. Alternatively, the reset transistor is a PMOS transistor.

Cell 10 also includes buffer transistor N2 and row select transistor N3, each of which is an NMOS transistor. Transistor N2 has a drain connected to Node 1, a source connected to Node 4, and a gate connected to Node 3. Transistor N3 has a drain connected to Node 4, a source connected to Node 6, and a gate connected to Node 5. The gate of transistor N3 is controlled (in a manner to be described below) by a ROW SELECT signal supplied to Node 5. Node 6 is a column readout line, and the FIG. 1 circuit typically includes several columns of cells, each having a column readout line.

As shown in FIG. 1, circuitry 20 includes detection and calculation circuit 21. Circuit 21 has an input terminal connected to Node 6, and other input terminals (not shown) connected to the column readout lines of the other columns of the cell array. Circuit 21 includes a sense amplifier for each column which outputs an analog voltage indicative of the light intensity incident at a cell along the column in response to voltages at Node 6 during a sampling period when each this cell is selected (typically, the sense amplifier outputs a sequence of analog voltages indicative of incident light intensity at each of a sequence of sequentially selected cells along the column). Circuit 21 typically implements correlated double sampling ("CDS") on the voltage of each column readout line, typically performs post-processing on the output of each sense amplifier, and typically includes an analog-to-digital converter for generating digital data in response to the analog signal output from each sense amplifier (or from post-processing circuitry coupled to each sense amplifier). Circuitry 20 also includes a current mirror (comprising current source I1 and NMOS transistors N4 and N5 connected as shown, and NMOS transistors identical to transistor N5 for the other columns) which provides the necessary load for reading out the cells of the array.

In normal operation, circuit 21 receives a sequence of voltages at Node 6 (which node is common to all cells connected along the column), with each pair of consecutive voltages being indicative of light intensity incident at a different one of the cells along the column. Typically, circuit 21 receives a sequence of voltages from the column readout line of each column of cells, each pair of consecutive voltages on each column readout line being indicative of light intensity incident at a different one of the cells along a different column of the array. Circuit 21 typically includes a scan circuit which sequentially reads out analog signals indicative of light intensities of cells (of different columns) which are simultaneously generated (in parallel).

The operation of sampling (reading) each cell (e.g., cell 10) begins by briefly pulsing the gate of the cell's reset transistor N1 with a high level (relative to the bottom rail) of reset voltage "RESET." This high level pulse of the reset voltage RESET (typically equal to Vcc, where Vcc is typically 5 volts) is a "full reset" signal (or "full reset" pulse or "full reset" potential) which resets the voltage on photodiode d1 to an initial integration voltage to begin an image collection cycle.

Immediately after assertion of such full reset pulse of the voltage "RESET," the initial integration voltage on photodiode d1 (the voltage at Node 3) is Vini=VRESET−VTN1−VCLOCK, where VTN1 is the threshold voltage of transistor N1, VRESET is the high level of the voltage "RESET," and VCLOCK is the voltage due to charge injection through transistor N1 from the pulsed reset voltage (assumed to be constant). Vini also contains kT/C noise which is not constant over time. Similarly, the initial integration voltage at Node 4 is VRESET−VTN1−VCLOCK−VTN2, where VTN2 is the threshold voltage of buffer transistor N2 (functioning as a source follower).

Next, for a selected time period, photons are allowed to strike photodiode d1, thereby creating electron-hole pairs. The photogenerated holes are attracted to the ground terminal of photodiode d1, while the photogenerated electrons are attracted to the positive terminal of photodiode d1, each additional electron reducing the voltage at Node 3. At the end of this image collection cycle, a final integration voltage will be present at Node 3. The final integration voltage is Vf=Vini−VS=VRESET−VTN1−VCLOCK−VS, where VS represents the change in voltage (at Node 3) due to the absorbed photons. Similarly, the final integration voltage at Node 4 is VRESET−VTN1−VCLOCK−VTN2−VS.

At the end of the image collection cycle, the gate of transistor N3 is pulsed with a high level of row select voltage signal "ROW SELECT" to cause the voltage at Node 4, which represents the final integration voltage of the cycle, to appear at Node 6. A CDS circuit within detection and calculation circuit 21 samples the value of the final integration voltage as it appears at Node 6.

Then, the gate of reset transistor N1 is again pulsed briefly with a high level of reset voltage "RESET" (a "full reset" signal) which resets the voltage on photodiode d1 to the initial integration voltage to begin another image collection cycle. Immediately after assertion of such full reset signal, the initial integration voltage at Node 4 is VRESET−VTN1−VCLOCK−VTN2. At this time, the gate of transistor N3 is again pulsed with a high level of row select voltage signal "ROW SELECT" to cause the voltage at Node 4, which represents the initial integration voltage of the cycle, to appear at Node 6. The CDS circuit within detection and calculation circuit 21 samples the value of the initial integration voltage as it appears at Node 6, and generates a difference signal indicative of the difference between the sampled final and initial integration voltages. The difference signal is an analog signal indicative of the voltage of interest (Vf−Vini=−VS) but not the threshold voltage VTN1 or VTN2. The kT/C noise is not compensated because the noise in the first sample (the sample of the final integration voltage) is not correlated to the noise in the second sample (the sample of the initial integration voltage)

Optionally, circuit 21 includes an inverter coupled and configured to invert the difference signal to generate an analog output indicative of the value: Vini−Vf=VS.

However, the conventional CMOS image sensor of FIG. 1 is subject to the serious limitation that its dynamic range is limited. As noted above, after a reset of each cell of the FIG. 1 sensor, photocurrent will slowly discharge the cell's photodiode at a rate dependent on the incident light intensity during an integration time until a reading of the cell. The cell has a linear response in the sense that there is a fixed ratio between the incident light intensity and the output of the ADC employed to generate the system's output (i.e., the ADC within circuit 21 of FIG. 1). Assuming a fixed integration time for each reading of each cell, each cell's dynamic range (and thus the sensor's dynamic range) depends on the maximum incident light intensity (Lmax) determined by Lmax=(Umax)/S, where S is the slope of each cell's linear response curve and Umax is the maximum value of the output of the ADC employed to generated the system's output. The dynamic range of a typical outdoor scene to be imaged can be much larger than the dynamic range of the voltage signal across each cell's photodiode. As a result, operation of the sensor results in either a complete saturation of the bright regions of the image, or a loss of detail in the dark regions of the image.

A known technique, to be referred to as the "extended dynamic range" (XDR) technique, for enhancing the dynamic range of an active pixel sensor cell (or array of cells), is described in S. Decker et al.: "A 256×256 CMOS Imaging Array with Wide Dynamic Range Pixels and Column-Parallel Digital Output," IEEE Journal of Solid State Circuits, vol. 33, no. 12, December 1998, pp. 2081–2091. The XDR technique enhances the dynamic range of the cells of an active pixel sensor cell array by compressing the signal indicative of each pixel (and changing the pixel response curve for each cell from a linear curve to a piecewise linear curve). In describing the XDR technique, we use the term "breakpoints" to denote the points along such a piecewise linear response curve at which adjacent linear sections of the curve intersect.

In accordance with the XDR technique, during each integration period (i.e., during integration of the photocurrents in the cells of a row), a pulse is applied to the gate of each of the reset transistors in the row. This pulse, referred to as an "XDR reset pulse," has a different amplitude (a smaller amplitude, where the reset transistors are NMOS transistors) than the "full reset" pulse asserted at the start of each integration period. The XDR reset pulse will affect only those cells on which a strong light signal is incident. Only if photocurrent has reduced the voltage across the cell's photodiode to below a certain level at the time the XDR reset pulse is asserted, the voltage across the photodiode will be pulled up to Vdac=Vxdr−Vth, where Vxdr is the voltage on the reset line (the potential applied to the gate of the reset transistor) and Vth is the threshold voltage of the reset transistor (e.g., reset transistor N1 of FIG. 1). If the optical signal is small, the voltage across the photodiode is larger than the reset potential, Vdac, during assertion of the XDR reset pulse and the voltage across the photodiode is not changed by the XDR reset. This is illustrated in FIGS. 2 and 3, in which time T0 is the start of a first integration period (the time of assertion of a reset pulse having amplitude Vreset to Node 2), time T1 during the first integration period is the time of assertion of an XDR reset pulse (having amplitude Vxdr) to Node 2, and time T2 is the start of a second integration period.

Figure 2:
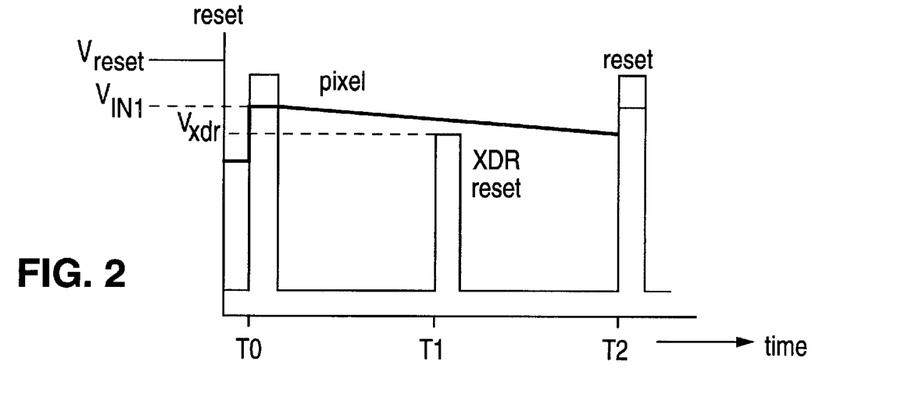
FIG. 2 is a diagram of potentials at Nodes 2 and 4 of the FIG. 1 circuit during operation with incident light of low intensity.

FIG. 2 represents a dark cell (exposed to low intensity incident illumination), in which the photodiode voltage (the potential at Node 3 of FIG. 1) falls slowly from $V_{INI}$ (at time T0) to a value greater than Vxdr (at time T1). Assertion of the XDR reset (with potential Vxdr) to Node 2 at time T1 does not affect the photodiode voltage of this cell.

Figure 3:
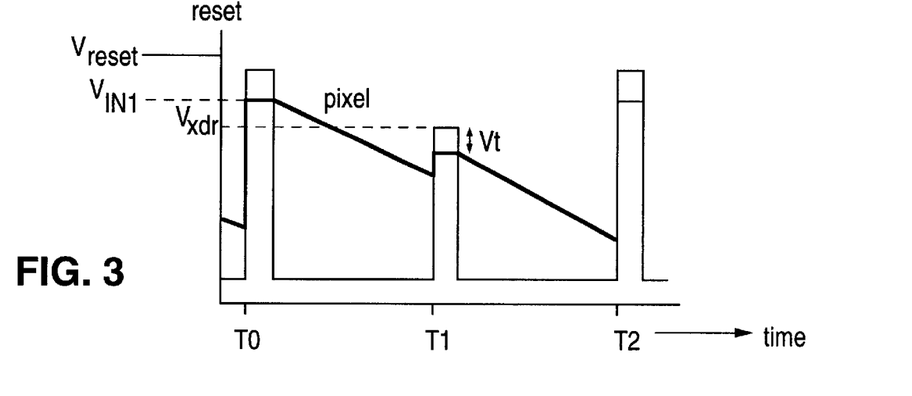
FIG. 3 is a diagram of potentials at Nodes 2 and 4 of the FIG. 1 circuit during operation with incident light of high intensity.

FIG. 3 represents a bright cell (exposed to high intensity incident illumination), in which the photodiode voltage (the potential at Node 3 of FIG. 1) falls rapidly from $V_{INI}$ (at time T0) to a value less than Vxdr (at time T1). Assertion of the XDR reset at time T1 does affect the photodiode voltage of this cell, by raising the photodiode voltage (at Node 3) to the value Vxdr−Vth at time T1, where Vth is the threshold voltage of transistor N1 of FIG. 1. During the rest of the integration period (between times T1 and T2), the photodiode voltage falls at the same rate as between times T0 and T1 to its final value at time T2.

Figure 4:
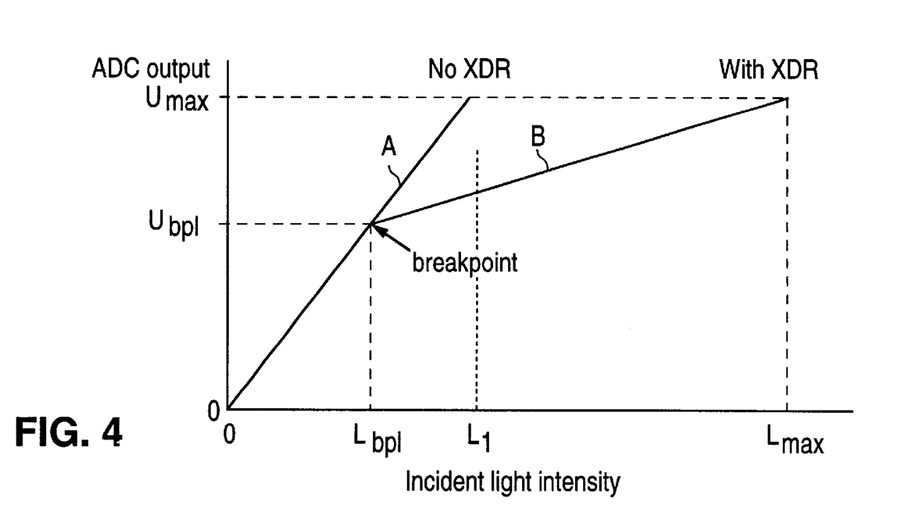
FIG. 4 is a graph of response curves of a cell of the FIG. 1 circuit.

By applying an XDR reset pulse during the integration period, the response curve of the image sensor is converted from a linear curve to a piecewise linear curve, as illustrated in FIG. 4. The vertical axis of FIG. 4 represents digital data output from circuit 21 (data output from the ADC within circuit 21) as a result of a read of one cell of FIG. 1 (data indicative of the difference between the final integration voltage at the end of an integration period and the initial integration voltage read at the start of the next integration period). The horizontal axis in FIG. 4 represents incident light intensity on the cell during the integration period. Curve A is the cell's response curve, indicating the range of detectable incident light intensity (from zero to L1) corresponding to the full range of circuit 21's output (from zero to Umax), when no XDR reset is asserted during the integration period. Curve B is the cell's response curve, indicating the widened range of detectable incident light intensity (from zero to Lmax, where intensity Lmax is greater than L1) corresponding to the full range of circuit 21's output, when an XDR reset is asserted during the integration period. The maximum detectable incident light intensity (Lmax) is Lmax=(Ubp1)/S+(Umax−Ubp1)/S', where Ubpi is circuit 21's output in response to incident light of intensity Lbpi (i.e., the output at the indicated breakpoint of the curve of FIG. 4), S is the slope of response curve B for values of incident light intensity less than Lbp1 (which is also the slope of linear response curve A), S' is the slope of response curve B for values of incident light intensity greater than Lbp1, and Umax is the maximum value of the output of the ADC employed to generate the system's output.

FIG. 4 illustrates how the XDR technique extends the dynamic range of the image sensor, namely by increasing the maximum detectable light intensity from L1 to Lmax. The coordinates of the breakpoint (Lbp1, Ubp1) depend on the photodiode voltage immediately after an XDR reset (Vdac=Vxdr−Vth) and the time at which the XDR reset is performed during the integration period. It is possible to perform two or more XDR resets in a single integration period, which results in a piecewise linear sensor response curve having N+1 linear sections, and N breakpoints (one breakpoint for each of N XDR resets), and can (in some cases) increase the dynamic range beyond that achievable with only one XDR reset per integration period.

When implementing the XDR technique, the voltage (Vxdr) supplied to the reset line during an XDR reset can be generated using a DAC. This allows the user to control the breakpoint coordinates by programming the voltage level and the time at which each XDR reset is performed (by asserting control bits to the timing and control block of a CMOS image sensor system to cause the timing and control block to assert appropriate control bits to the DAC with appropriate timing).

Although it would be convenient for the user if the digital codes that are programmed into the DAC (and/or the timing and control block) to determine XDR breakpoints would result in a predetermined piecewise linear sensor response curve for each cell coupled to the DAC, until the present invention it had not been known how to accomplish this in a manner avoiding deviations in the actually implemented response curves relative to the desired response curves. The present inventors have recognized that several problems give rise to such deviations (errors).

One such problem is that an important parameter in programming the level of an XDR reset pulse is that the voltage to which the photodiode is reset in response to the XDR reset pulse is a reset transistor threshold voltage below the XDR reset potential (Vxdr) supplied to the reset line (e.g., the voltage across photodiode d1 of FIG. 1 just after the photodiode has been reset by an XDR reset is Vdac=Vxdr−Vth, where Vth is the threshold voltage of NMOS transistor N1 of FIG. 1 and Vxdr is the XDR reset potential asserted to the gate of transistor N1), and the threshold voltage is subject to variation due to variables in manufacture and varying operating parameters. An attempt to simply raise the XDR reset voltage Vout supplied to the reset line by a predetermined constant voltage above the desired resulting voltage across the photodiode would fail, because process variations in implementing the CMOS image sensor would cause variations in the threshold voltage of the reset transistor (e.g., transistor N1 of FIG. 1), and because temperature variations during operation would also affect the threshold voltage of the reset transistor. Such variations in the threshold voltage of the reset transistor would in turn cause errors in the breakpoint levels programmed into the sensor cells. The present invention solves this problem by matching the reset transistors inside the cells with a reference transistor in a new XDR reset pulse generating circuit (implemented as part of the same chip including the sensor cells), such that the threshold voltage of the reference transistor is added to the output of the DAC employed to control the level of each XDR reset pulse.

An attempt to simply raise the XDR reset voltage Vxdr supplied to the reset line by a predetermined constant voltage above the desired voltage across the photodiode would also fail because the so-called "body effect" causes the threshold voltage of the reset transistor to be signal dependent, whereas the predetermined constant voltage would not be signal dependent. The present invention solves this problem by matching the biasing of the above-mentioned reference transistor to that of the reset transistors inside the cells.

U.S. Pat. No. 6,040,570, issued Mar. 21, 2000, teaches a CMOS imaging system which implements the XDR technique using two sets of CDS circuits: one set (comprising a CDS circuit for each column) for generating an output indicative of the difference between the voltage across each photodiode of a row at the beginning and the end of an integration period; the other set (also comprising a CDS circuit for each column) for generating an output indicative of the difference between the voltage across each photodiode immediately after an XDR reset pulse is asserted to the cell and at the end of the integration period. In order to read the cells of the row, the outputs of both sets of CDS circuits need to be combined. The present invention allows implementation of the XDR technique using simpler (and less expensive) circuitry using only a single set of CDS circuits (comprising only one CDS circuit for each column), and does not require circuitry for combining the outputs of two sets of CDS circuits.

SUMMARY OF THE INVENTION

In a class of embodiments, the invention is an active pixel sensor cell array including an XDR reset signal generation circuit configured to generate XDR reset signals having user-selected levels (with user-selected timing). The inventive XDR reset signal generation circuit includes a digital-to-analog converter (DAC) and a level shifting circuit coupled to the output of the DAC, and is programmed by asserting user-specified control bits to the DAC. In response to the control bits (which are a sequence of eight-bit control words in preferred embodiments), the circuit asserts a time-varying XDR reset potential which is a sequence of XDR reset pulses each having an amplitude determined by the control bits. The amplitude of the XDR reset potential as function of time (during each integration period) determines the breakpoints of the response curve of each cell. The level shifting circuit includes a reference transistor (matched to the reset transistors inside the cells), and the reference transistor is coupled so as to shift the potential at the DAC's output upward by an amount equal to the reference transistor's threshold voltage (which matches the threshold voltage of each reset transistor of the cell array), thus producing the XDR reset potential.

To establish a predetermined relationship between the control bits asserted to the DAC and the actually implemented piecewise linear response curve for each cell coupled to the DAC (i.e., to cause the control bits to establish breakpoints which in turn cause the internal analog-to-digital converter (ADC) of the image sensor array to assert (predictably) an expected set of digital output bits in response to each read of a cell exposed to light of known intensity), both the ADC and the DAC operate at the same reference voltage, and the biasing of the reference transistor (of the level shifting circuit) matches that of the reset transistors inside the cells of the array. Unless the XDR reset pulses are generated in accordance with the invention, the XDR reset pulses would result in ADC output codes which depend on the threshold voltages of transistors in the image sensor cell array (the array is typically implemented as an integrated circuit), and which thus depend on process and temperature variations in implementing the array and on variations in the potentials asserted to the array's transistors during operation, which variations would result in deviations between the desired ADC output codes and those actually generated.

Other aspects of the invention are an XDR reset signal generation circuit including a digital-to-analog converter (DAC), a level shifting circuit coupled to the output of the DAC, and optionally also a timing and control block, for use with an active pixel sensor cell or cell array, and a method for generating XDR reset signals for enhancing the dynamic range of an active pixel sensor cell or cell array.

DETAILED DESCRIPTION OF THE PREFERRED EMBODIMENTS

Figure 5:
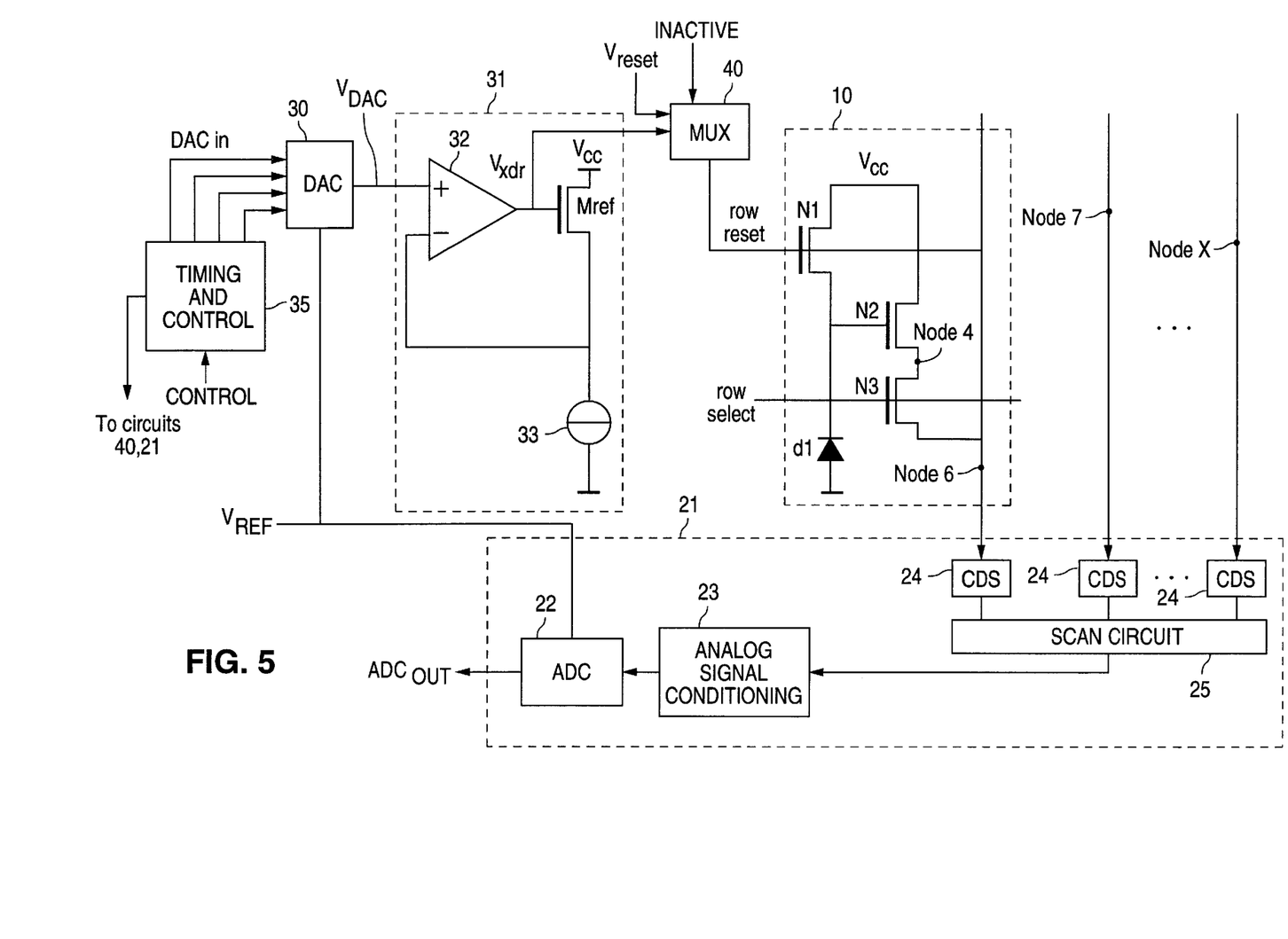
FIG. 5 is a schematic diagram of a CMOS active pixel sensor cell and other portions of a CMOS active pixel sensor cell array which embodies the invention.

FIG. 5 is a schematic diagram of an active pixel sensor cell 10, an XDR reset signal generation circuit comprising digital-to-analog converter (DAC) 30 and level shifting circuit 31 coupled to the output of DAC 30, a multiplexer 40, timing and control circuitry 35, and detection and calculation circuit 21 (having an input terminal connected to Node 6 of cell 10) of a CMOS active pixel sensor cell array embodying the invention. The array typically includes an array of rows and columns of cells identical to cell 10. Circuit 21 includes a conventional analog signal conditioning circuit 23, CDS circuits 24 and a conventional scan circuit 25 (to be described), and a conventional analog-to-digital converter (ADC) 22. ADC 22 outputs digital data indicative of light intensity incident at each of a sequence of selected cells (of the array) in response to analog voltages asserted by CDS circuits 24 during a sequence of sampling periods (where one row of cells is selected during each sampling period). Cell 10 of FIG. 5 is identical to above-described cell 10 of FIG. 1, and the description thereof will not be repeated with reference to FIG. 5.

We describe an implementation of the FIG. 5 circuit which includes multiple rows and multiple columns of cells identical to cell 10. In such implementation, the column along which cell 10 is connected includes Node 6, the next column includes Node 7, and the last column includes Node X. A row decoder (not shown) is coupled to all the rows of cells, and sequentially selects each row to be read. Multiplexer 40 is coupled to the reset transistors of all cells of the row which includes cell 10. For each other row of the array, a multiplexer identical to multiplexer 40 is coupled to the reset transistors of the row's cells.

Circuit 21 of FIG. 5 is identical to circuit 21 of FIG. 1, and operates in response to a reference potential VREF (indicated in FIG. 5 but not FIG. 1). According to the invention, DAC 30 operates in response to the same reference potential (VREF).

Circuit 21 includes a CDS circuit 24 for each column. The outputs of the CDS circuits 24 are coupled to scan circuit 25, and the output of scan circuit 25 is coupled to analog signal conditioning circuit 23. In operation, analog signals asserted at the outputs of the CDS circuits 24 (one analog signal for each column) are sequentially passed to analog signal conditioning circuit 23. In response to the output of circuit 23, ADC 22 outputs digital data indicative of light intensity incident at each cell (of the row being read) during a sampling period in which the row is selected and the cells of the row are read.

The FIG. 5 circuit operates in the same way that the FIG. 1 circuit does, except in that it generates each XDR reset pulse and asserts each XDR reset pulse to the gate of the reset transistor in each cell to be read in accordance with the invention, in a manner to be explained below.

Level shifting circuit 31 of FIG. 5 comprises op amp 32, reference transistor Mref, and current sink 33, connected as shown. Reference transistor Mref is an NMOS transistor whose characteristics (e.g., channel width and length) are such that the current density (of the current through its channel) matches that of reset transistor N1 (and each other reset transistor of the cell array). Since transistor N1 (and each of the other reset transistors) is typically implemented to conduct very low channel current, reference transistor Mref is typically implemented to conduct greater channel current through a larger channel than transistor N1 (but with current density equal to that of transistor N1). The gate of transistor Mref is coupled to the output terminal of op amp 32, and transistor Mref is operated in exactly the same bias configuration as is reset transistor N1 of cell 10 of FIG. 5 (during each XDR reset). The source of reference Mref is coupled to current sink 33 and to the inverting input of op amp 32.

Both ADC 22 and DAC 30 are driven by the same reference potential (VREF), the biasing of reference transistor Mref matches that of reset transistor N1 (of cell 10) and the reset transistors inside the other cells of the row comprising cell 10, and the characteristics of reference transistor Mref are such that the current density of transistor Mref matches that of reset transistor N1 of cell 10 and each of the reset transistors in the other cells of the row comprising cell 10.

Timing and control circuitry 35 receives external control bits (identified as "CONTROL" in FIG. 5) which determine the parameters (e.g., $U_{x1}$ and $T_{x1}$ to be described below) necessary for programming DAC 30 to generate XDR reset pulses for causing cell 10 (and other cells to which the output of circuit 31 can be coupled) to operate with a desired piecewise linear response curve (having one or more predetermined breakpoints), and for enabling circuitry 35 to control the other elements of the FIG. 5 system (including circuits 30 and 21) to perform reads of active pixel sensor cells. In response, timing and control circuitry 35 asserts control bits "DACin" to DAC 30 with appropriate timing. Typically, multiple control bits "DACin" are asserted to DAC 30 in parallel (as 8-bit or other multi-bit words), and output bits "ADCout" appear at the output of ADC 22 as multi-bit words.

To operate the FIG. 5 circuit, a desired piecewise linear response curve (for each sensor cell) is predetermined. The response curve has one or more predetermined breakpoints. Circuitry 35 is programmed with control bits ("CONTROL") indicative of the breakpoints. Then, the programmed circuitry 35 is operated to assert sets of control bits "DACin" (with appropriate timing) to DAC 30, to cause DAC 30 and circuit 31 to assert a time varying XDR reset voltage (potential "Vxdr" above ground) to multiplexer 40. Multiplexer 40 is controlled (by control signals asserted thereto by circuitry 35) to assert one of potential Vxdr, reset potential Vreset, and potential INACTIVE at a time (sequentially, with appropriate timing) to the gate of reset transistor N1 to implement reads of cell 10. Reset potential Vreset is asserted to transistor N1 to trigger the start of an integration period. Potential INACTIVE is asserted to transistor N1 at times when cell 10 is not being read (i.e., at times other than during an integration period). Preferably, the control bits ("CONTROL") are indicative of combinations of parameters (e.g., $U_{x1}$ and $T_{x1}$ to be described below) which are in turn indicative of the breakpoints of a piecewise linear response curve, where at least some of the parameters have the same range of values as do output words "ADCout" asserted by ADC 22. For example, in a preferred embodiment, the control bits ("CONTROL") are indicative of parameters $U_{x1}$ and $T_{x1}$ (to be described below), where $U_{x1}$ is indicative of an output word "ADCout" asserted by ADC 22 under a defined set of operating conditions (or a rounded version of such output word). Circuit 31 is configured so that there is a predetermined relationship between the control bits "DACin" asserted to DAC 30 and the actually implemented piecewise linear response curve for cell 10, so that the control bits "DACin" establish breakpoints which in turn cause ADC 22 to assert (in predictable, predetermined fashion) an expected set of output bits "ADCout" in response to each read of cell 10 when cell 10 is exposed to light of known intensity, independent of process, temperature, and signal level variations in manufacture and operation of the FIG. 5 system.

DAC 30 is configured so that in response to each particular word "DACin," DAC 30 asserts a voltage Vdac which is the voltage (above ground) to which it is desired to reset Node 3 of cell 10 in response to an XDR reset pulse at the gate of transistor N1 (when cell 10 is exposed to incident light having intensity above the minimum causing a reset of the Node 3 potential). Operational amplifier 32 shifts the voltage Vdac at the output of DAC 30 up by one threshold voltage (of reference transistor Mref of level shifting circuit 31) to compensate for the threshold voltage of reset transistor N1 inside cell 10. Reference transistor Mref of level shifting circuit 31 has current density matching that of transistor 10 of cell 10 and is operated in exactly the same bias configuration as is transistor N1 of cell 10, so the body effect in these two transistors has exactly the same magnitude. As explained below, the user typically determines desired values for cell output voltages (e.g., below-defined voltage $U_{x1}$, which is the voltage at Node 4 of cell 10 immediately after an XDR reset pulse having potential "Vxdr" has reset the photodiode, and below-defined voltages $U_{x2}$ and $U_{x3}$), and for XDR pulse assertion times. Timing and control circuitry 35 and/or DAC 30 can be implemented to effectively translate each such user-determined voltage into the desired voltage Vdac at the output of DAC 30. For example, in response to a user-defined voltage $U_{x1}$, circuitry 35 and DAC 30 can be implemented so that DAC 30 outputs the voltage Vdac=$U_{x1}$. Alternatively, DAC 30 can be implemented to perform any desired translations of the programming parameters (e.g., DAC 30 can be implemented to output the voltage $U_{x1}$+Vth2 in response to user entry of parameter $U_{x1}$ to timing and control circuitry 35, where Vth2 is an arbitrarily chosen value representing a threshold voltage for a buffer transistor of a cell).

Typically, the output of multiplexer 40 is provided simultaneously to all the cells connected along a row of the cell array, and a CDS circuit identical to CDS circuit 24 is coupled to each column of the array (so that all the cells connected along a single row are read in parallel). Thus, all the cells in a row have simultaneous integration periods, and the cells along each column cycle through sequential (non-simultaneous) integration periods. Typically, the system includes a multiplexer (identical to multiplexer 40) for each row of the array, and one level shifting circuit 31 provides the XDR reset potential Vxdr to all the multiplexers. Alternatively, each of a plurality of level shifting circuits (each identical to level shifting circuit 31) is coupled to each of a plurality of multiplexers (one multiplexer, identical to multiplexer 40, for each row), and each level shifting circuit asserts an XDR reset potential Vxdr (for a different row of the array) to the multiplexer coupled thereto (in such alternative embodiments, the reference transistor Mref in each level shifting circuit is designed so that its current density matches that of the reset transistors in the row of cells to which the relevant multiplexer is coupled, but the current densities of the reset transistors and reference transistors can vary from row to row).

As noted, the FIG. 5 circuit desirably implements a one-to-one relationship between the digital codes programmed into timing and control circuitry 35 (to achieve desired breakpoints) and the digital codes output from ADC 22 (in response to light of specified values of intensity). This one-to-one relationship is achieved independent of process induced variations of the threshold voltages of the FIG. 5 circuit's reset transistors, and variations in temperature and bias voltage experienced by such reset transistors during operation of the FIG. 5 circuit. Specifically, the invention allows DAC 30 to be programmed in response to codes (asserted to timing and control circuitry 35) indicative of ADC 22 output values, such as the maximum output of ADC 22 (Umax), the output voltage of a cell at a specified time (e.g., $U_{x1}$), and the output of ADC 22 (e.g., Ubp1) in response to light of "breakpoint" intensity (e.g., Lbp1) when operated with a desired breakpoint, and other codes determined by the structure of the FIG. 5 circuit (e.g., codes indicative of the full integration period Tx0, and the time of assertion of each desired XDR reset pulse). Examples of specific relationships between the digital codes programmed into timing and control circuitry 35 (to achieve desired breakpoints) and the digital codes output from ADC 22 will be provided below.

If ADC 22 has a larger resolution than DAC 30 (if words "ADCout" have more bits than words "DACin"), then the most significant bits of each control word (input to timing and control circuitry 35) indicative of an ADC 22 output value "ADCout" preferably correspond to the most significant bits of each corresponding one of the words "ADCout."

The operation of both ADC 22 and DAC 30 in response to the same reference potential (VREF), and the biasing of reference transistor Mref to match that of reset transistor N1 (of cell 10) and the reset transistors inside the other cells connected along the same row as is cell 10 eliminates the effect of process and temperature variations in implementing each CMOS image sensor which would otherwise cause variations in the threshold voltage of the reset transistor (e.g., transistor N1 of FIG. 1), and the signal dependent "body effect" on the threshold voltage of the reset transistor, which would in turn cause errors in the breakpoint levels achieved in the cells of the sensor in response to any set of control bits "DACin" asserted to DAC 30.

Because the photocurrent in each cell of the CMOS active pixel sensor cell array of FIG. 5 is integrated, the basic physical quantity that defines its sensitivity, S, has a unit of [V/(Lux*sec)]. If the integration time is Ti, a cell's output voltage at the end of the integration period is given by:

$$U_0 = S \cdot T_i \cdot L \quad [1]$$

in which L is the illumination level of the pixel in units of lux, and S is a sensitivity constant. After a cell has been reset, the signal voltage across the cell, Upix, increases linearly with time (actually, the signal voltage is reset to a nonzero value, e.g., 5 volts, and decrease linearly with time due to the photocurrent, but signal voltage is measured with respect to the reset level and is defined to be positive by choice of the sign of the constant S).

From a user's point of view, given a certain frame integration time, what matters is the output voltage of the sensor per lux, which can be expressed using a sensitivity, R, having units of [V/lux]:

$$R = \frac{dU_0}{dL} = S \cdot T_i \quad [2]$$

Figure 6:
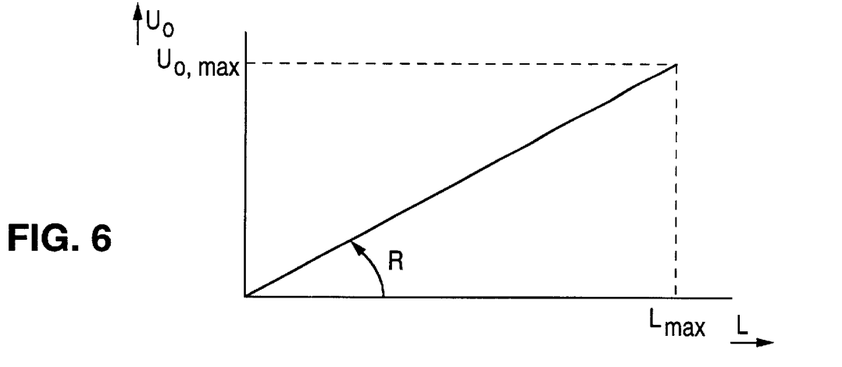
FIG. 6 is a graph of the output signal of a cell (of FIG. 5) as a function of the intensity (L) of radiation incident on the cell during a fixed integration period.

FIG. 6 shows the output signal of the pixel, $U_0$, versus the illumination level, L. The slope of the curve graphed in FIG. 6 is R, as determined by Equation 2.

The maximum output signal that can be generated ($U_{0,max}$) is determined by the full well capacity of the sensor. The maximum light level that can be detected is given by:

$$L_{max} = \frac{U_{0,max}}{R} = \frac{U_{0,max}}{S \cdot T_i} \quad [3]$$

From this equation it can be seen that the maximum light level that can be detected can be increased by reducing the integration time, $T_i$. If the integration time is reduced, the output voltage at the end of the integration time will have a smaller absolute value when it is read out. This allows the detection of light levels that would otherwise have saturated the pixel. The maximum light level can be decreased by increasing the integration time. The output voltage versus illumination level curve can be optimized for a specific lightning conditions using the theory described above. For high illumination levels, the integration time can be reduced, which reduces the sensitivity and increases the input range of the sensor. For low illumination levels, the sensitivity can be increased by increasing the integration time.

In many applications, it is not sufficient to adjust the sensitivity by changing the integration time. Many images contain both dark regions and bright regions. In such images, a large sensitivity would allow the observation of details in the dark regions, but in the bright regions of the image, the sensor would be saturated. A small sensitivity would allow the observation of detail in the bright regions, but the dark regions of the image would remain completely dark. This problem is addressed by implementing an extended dynamic range technique to convert the curve indicative of output signal versus illumination level into a piecewise linear curve, such as the one shown in FIG. 4. The curve in FIG. 4 consists of two branches (for output voltage not greater than $U_{bp1}$ and greater than $U_{bp1}$, respectively). The first branch has a sensitivity:

$$R_0 = \frac{U_{bp1}}{L_{bp1}} \quad [4]$$

in which $U_{bp1}$ is the output level at which the first branch stops and the second branch takes over, and $L_{bp1}$ is the maximum light level that can be detected on the first branch. The sensitivity of the second branch is:

$$R_1 = \frac{U_{0,max} - U_{bp1}}{L_{max} - L_{bp1}} \quad [5]$$

in which $L_{max}$ is the maximum light level that can be detected. The breakpoint is implemented by resetting the pixel voltage to a certain level, $U_{x1}$, a certain time, $T_{x1}$, before the pixel is read out (by asserting an XDR reset pulse to the reset transistor of the cell, as described above). By using the XDR reset pulse, small light levels will be detected with a sensitivity:

$$R_0 = S \cdot T_{x0} \quad [6]$$

in which $T_{x0}$ is the full integration time, i.e. the time between the start of the integration and the readout.

Figure 7:
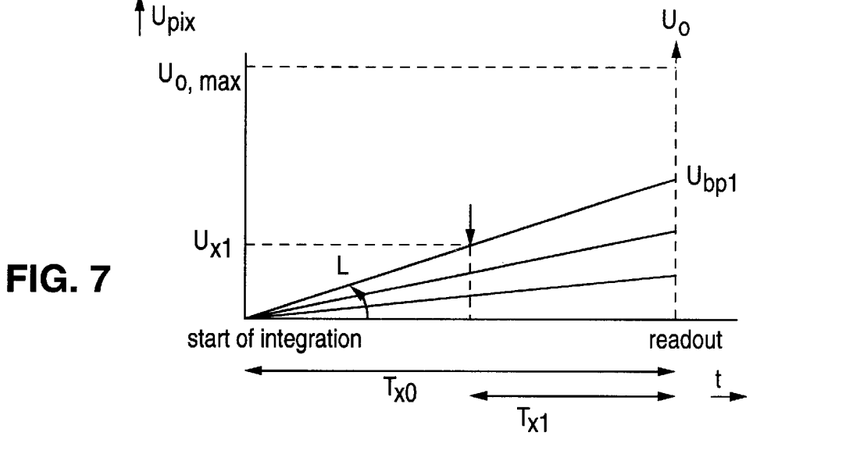
FIG. 7 is a graph of the output signal of a cell (of FIG. 5) as a function of time for each of four different intensities of radiation incident on the cell during a fixed integration period of duration $T_{x0}$.

The value of $L_{bp1}$ is the maximum light level that can be detected with sensitivity $R_0$. This light level causes an output voltage $U_{x1}$ at a time $(T_{x0}-T_{x1})$ after the start of the integration, as indicated in FIG. 7. With reference to the FIG. 5 embodiment, voltage $U_{x1}$=Vxdr−Vth, where Vxdr is the XDR reset potential asserted to the gate of transistor N1 at time $T_{x0}-T_{x1}$ after the start of the integration, and Vth is the threshold voltage of reset transistor N1.

Having defined $U_{x1}$, it is also true that:

$$L_{bp1} = \frac{U_{x1}}{S \cdot (T_{x0} - T_{x1})} \quad [7]$$

The light level $L_{bp1}$ will generate an output voltage (at the readout time at the end of integration period) having magnitude:

$$U_{bp1} = \frac{U_{x1}}{T_{x0} - T_{x1}} \cdot T_{x0} \quad [8]$$

Output voltage $U_{bp1}$ is the maximum output voltage that can be generated by the FIG. 5 system operating with sensitivity $R_0$, in response to incident light level $L_{bp1}$. Note that $U_{bp1}$ is does not equal $U_{x1}$. For each incident light level less than or equal to $L_{bp1}$, the FIG. 5 system generates an output voltage less than or equal to $U_{bp1}$ at the end of a full integration period, and the XDR reset has no effect on the output voltage at the end of the full integration period (as is apparent from inspection of FIG. 7).

For larger illumination levels, the XDR reset does influence the output voltage at the end of the integration period. For illumination levels larger than $L_{bp1}$, during the integration, the integration is restarted with an offset level $U_{x1}$. For such larger illumination levels, the final output voltage signal (at the end of the integration period) will equal:

$$U_0 = U_{x1} + S \cdot T_{x1} \cdot L \quad [9]$$

Therefore, the sensitivity with which those illumination levels will be converted into an output voltage is:

$$R_1 = S \cdot T_{x1} \quad [10]$$

which is smaller than $R_0$ ( of equation [6]).

The maximum light level that can be detected can be determined from equation [9]:

$$U_{0,max} = U_{x1} + S \cdot T_{x1} \cdot L_{max} \quad [11]$$

and therefore:

$$L_{max} = \frac{U_{0,max} - U_{x1}}{S \cdot T_{x1}} \quad [12]$$

Usually, the user will start by designing a curve such as shown in FIG. 5 (i.e., the user will define $U_{bp1}$, $L_{bp1}$ and $L_{max}$). From this designed curve, the values (e.g., $U_{x1}$, $T_{x1}$, and optionally also $T_{x0}$) that are to be programmed into timing and control circuitry 35 can be found using a simple procedure that will be described below. First, the sensitivity of the first branch of the piecewise linear curve is used to determine the value of $T_{x0}$ (the duration of the full integration period):

$$R_0 = \frac{U_{bp1}}{L_{bp1}} \quad [13]$$

and therefore (from equation [6]):

$$T_{x0} = \frac{R_0}{S} = \frac{U_{bp1}}{S \cdot L_{bp1}} \quad [14]$$

The FIG. 5 system is typically implemented so that any of a range of values of the parameter $T_{x0}$ is programmable into XDR breakpoint registers of circuitry 35 following manufacture of the FIG. 5 system, so that different values of this parameter can be select ed by the user. If a small sensitivity is required (high illumination levels) $T_{x0}$ can be reduced (achieving partial frame integration). In very dark environments, $T_{x0}$ should be as large as possible to obtain high sensitivities. This can be achieved using frame delay and row delay. However, $T_{x0}$ can not be chosen larger than 1/F, where F is the frame rate. This poses a limit to the maximum sensitivity that can be achieved on the first branch of the piecewise linear transfer curve.

After $T_{x0}$ has been determined, $T_{x1}$ is found from the sensitivity (slope) of the second branch of the transfer curve:

$$R_1 = \frac{U_{max} - U_{bp1}}{L_{max} - L_{bp1}} \quad [15]$$

and therefore (from equation [10]):

$$T_{x1} = \frac{U_{max} - U_{bp1}}{S \cdot (L_{max} - L_{bp1})} \quad [16]$$

This is a value that can be programmed into the breakpoint registers of circuitry 35.

Finally, the value of $U_{bp1}$ is used to find the value that needs to be programmed into circuitry 35 for $U_{x1}$ (using equation [8]):

$$U_{x1} = \frac{T_{x0} - T_{x1}}{T_{x0}} \cdot U_{bp1} \quad [17]$$

The value of $T_{x1}$ that can be programmed into circuitry 35 is typically given as a multiple number of line times (in case of an image sensor with more than 256 rows, and with an 8 bit register, it can only be programmed as multiples of two or three line times). Therefore, the value determined by equation [16] should be rounded to a nearest number of linetimes. If the value of $U_{x1}$ is set by an eight bit DAC (e.g., if DAC 30 of FIG. 5 accepts eight-bit input words "DACin") and can only be set with an eight bit resolution, the value determined by equation [16] should be rounded of the nearest available level. It is advisable to recalculate the realized coordinates of the breakpoints after calculating the values to be programmed in the breakpoint registers using the equations given above.

Figure 8:
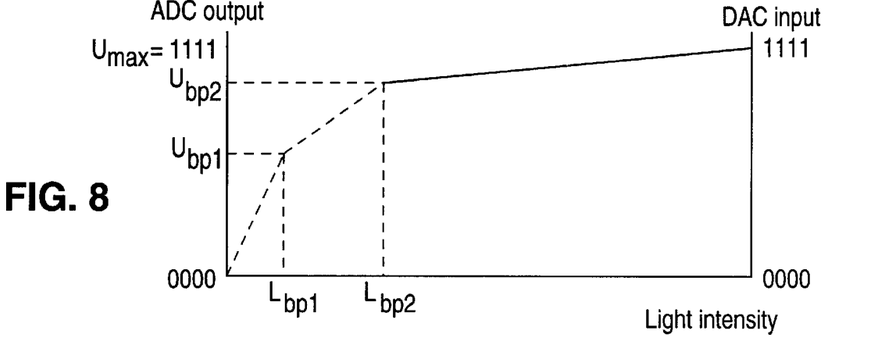
FIG. 8 is a graph of the output of ADC 22 of FIG. 5 as a function of the intensity of radiation incident on a cell, where two XDR reset pulses are asserted to the cell during the integration period to determine a response curve having two breakpoints as indicated.

So far, only a one breakpoint system has been described. In preferred embodiments (to be described with reference to FIG. 8), the FIG. 5 system is implemented to define up to three breakpoints. The following equations can be used to set the breakpoints in a two breakpoint implementation of such system:

$$T_{x0} = \frac{U_{bp1}}{S \cdot L_{bp1}} \quad [18]$$

$$T_{x1} = \frac{U_{bp2} - U_{vp1}}{S \cdot (L_{bp2} - L_{bp1})} \quad [19]$$

$$U_{x1} = \frac{T_{x0} - T_{x1}}{T_{x0}} \cdot U_{bp1} \quad [20]$$

$$T_{x2} = \frac{U_{max} - U_{bp2}}{S \cdot (L_{max} - L_{bp2})} \quad [21]$$

$$U_{x2} = U_{x1} + \frac{T_{x1} - T_{x2}}{T_{x1}} \cdot (U_{bp2} - U_{x1}) \quad [22]$$

where $T_{x1}$ is the time between the first XDR reset pulse (determining the first breakpoint, $U_{bp1}$, $L_{pb1}$, shown in FIG. 8) and the second XDR reset pulse (determining the second breakpoint, $U_{bp2}$, $L_{pb2}$, also shown in FIG. 8), and $T_{x2}$ is the time between the second XDR reset pulse and the end of the integration period. After rounding of the calculated values, the realized breakpoint curves are determined by:

$$U_{bp1} = \frac{U_{x1}}{T_{x0} - T_{x1}} \cdot T_{x0} \quad [23]$$

$$U_{bp2} = U_{x1} + \frac{U_{x2} - U_{x1}}{T_{x1} - T_{x1}} \cdot T_{x1} \quad [24]$$

$$L_{bp1} = \frac{U_{x1}}{S \cdot (T_{x0} - T_{x1})} \quad [25]$$

$$L_{bp2} = \frac{U_{x2} - U_{x1}}{S \cdot (T_{x1} - T_{x2})} \quad [26]$$

$$L_{\max} = \frac{U_{0,\max} - U_{x2}}{S \cdot T_{x2}} \quad [27]$$

In a three breakpoint implementation of the FIG. 5 system, the equations determining the programmable parameters are:

$$T_{x0} = \frac{U_{bp1}}{S \cdot L_{bp1}} \quad [28]$$

$$T_{x1} = \frac{U_{bp2} - U_{bp1}}{S \cdot (L_{bp2} - L_{bp1})} \quad [29]$$

$$U_{x1} = \frac{T_{x0} - T_{x1}}{T_{x0}} \cdot U_{bp1} \quad [30]$$

$$T_{x2} = \frac{U_{bp3} - U_{bp2}}{S \cdot (L_{bp3} - L_{bp2})} \quad [31]$$

$$U_{x2} = U_{x1} + \frac{T_{x1} - T_{x2}}{T_{x1}} \cdot (U_{bp2} - U_{x1}) \quad [32]$$

$$T_{x3} = \frac{U_{\max} - U_{bp3}}{S \cdot (L_{\max} - L_{bp3})} \quad [33]$$

$$U_{x3} = U_{x2} + \frac{T_{x2} - T_{x3}}{T_{x2}} \cdot (U_{bp3} - U_{x2}) \quad [34]$$

where $T_{x1}$ is the time between the first XDR reset pulse (determining the first breakpoint, $U_{bp1}$, $L_{pb1}$) and the second XDR reset pulse (determining the second breakpoint, $U_{bp2}$, $L_{pb2}$), $T_{x2}$ is the time between the second XDR reset pulse and the third XDR reset pulse (determining the third breakpoint, $U_{bp3}$, $L_{pb3}$), $T_{x3}$ is the time between the third XDR reset pulse and the end of the integration period, and $U_{x1}$, $U_{x2}$, and $U_{x3}$ are the output voltages at the XDR reset times.

After rounding of the values (as needed to determine control words of suitable length for programming DAC 30), the realized breakpoint curves are determined by:

$$U_{bp1} = \frac{U_{x1}}{T_{x0} - T_{x1}} \cdot T_{x0} \quad [35]$$

$$U_{bp2} = U_{x1} + \frac{U_{x2} - U_{x1}}{T_{x1} - T_{x1}} \cdot T_{x1} \quad [36]$$

$$U_{bp3} = U_{x2} + \frac{U_{x3} - U_{x2}}{T_{x2} - T_{x3}} \cdot T_{x2} \quad [37]$$

$$L_{bp1} = \frac{U_{x1}}{S \cdot (T_{x0} - T_{x1})} \quad [38]$$

$$L_{bp2} = \frac{U_{x2} - U_{x1}}{S \cdot (T_{x1} - T_{x2})} \quad [39]$$

$$L_{bp3} = \frac{U_{x3} - U_{x2}}{S \cdot (T_{x2} - T_{x3})} \quad [40]$$

$$L_{\max} = \frac{U_{0,\max} - U_{x3}}{S \cdot T_{x3}} \quad [41]$$

Figure 9:
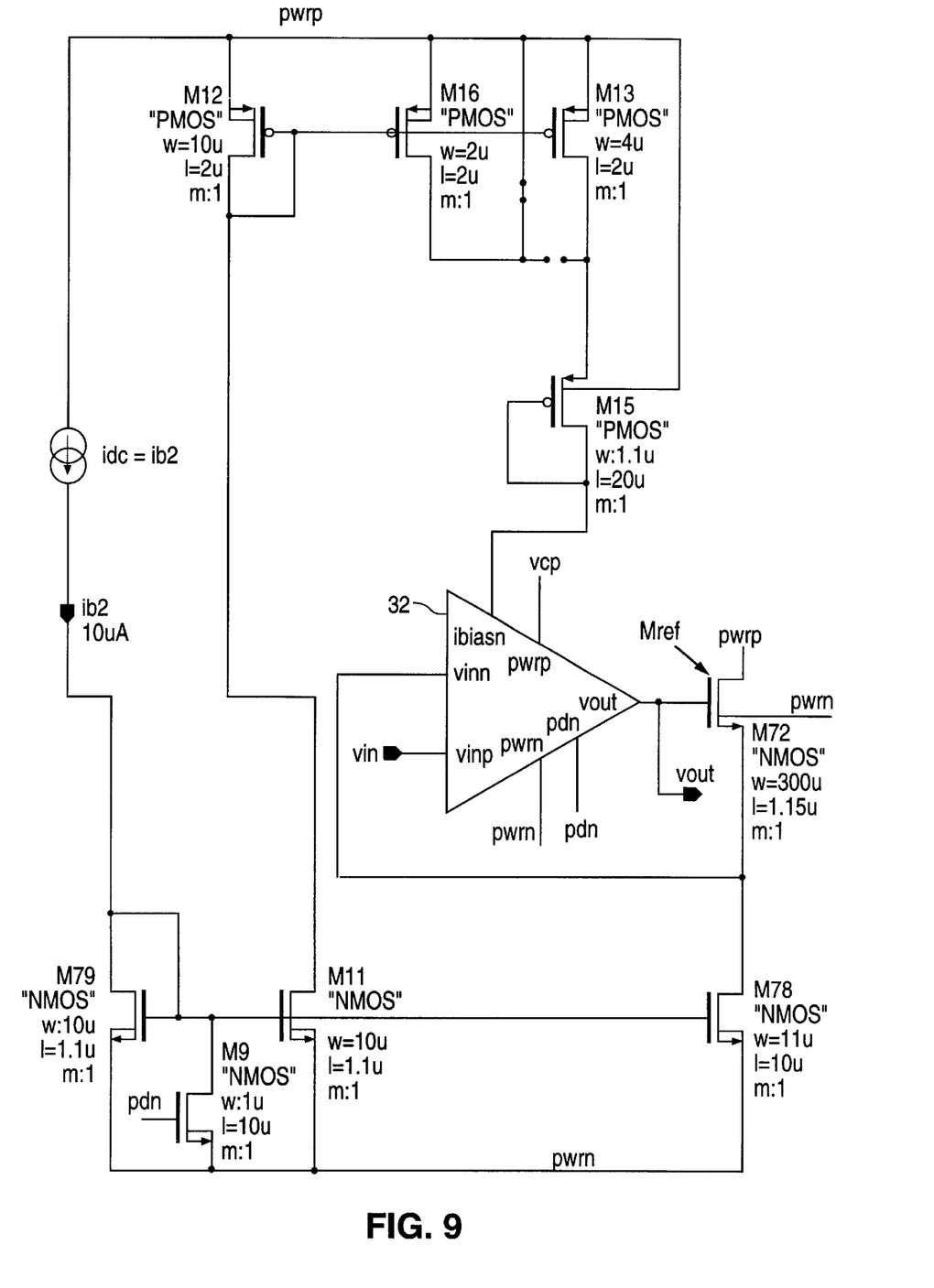
FIG. 9 is a schematic diagram of a preferred implementation of the level shifting circuit of the inventive XDR reset signal generation circuit.

FIG. 9 is a schematic diagram of a preferred implementation of level shifting circuit 31 of the FIG. 5 embodiment of the inventive XDR reset signal generation circuit. In FIG. 9, the potential "Vin" asserted to input "vinp" of op amp 32 is the potential $V_{dac}$ asserted at the output of DAC 30, and the potential "Vout" at the output of op amp 32 is the potential Vxdr to be asserted to multiplexer 40 (of FIG. 5).

Transistor Mref of FIG. 9 is an NMOS transistor having a channel whose width to length ratio is 300/1.15 (so that the current density of Mref matches the current density of the smaller NMOS reset transistor N1 of cell 10 of FIG. 5). The drain of transistor Mref of FIG. 9 is maintained at top rail potential "pwrp" (which is 5 volts above bottom rail potential "pwrn" in a preferred implementation), and the source of transistor Mref is coupled to ground through the channel of transistor M78 (whose gate is biased at a potential determined by NMOS transistors M79 and M9 (connected as shown). Thus, transistor Mref is operated in exactly the same bias configuration as is reset transistor N1 of cell 10 of FIG. 5 (during each integration period).

Bias current ib2 (which is 10 microamps in a preferred implementation) flows to the bottom rail through the channel of M79. The gate of M9, and op amp 32, are coupled to receive control signal "pdn" which undergoes a low-to-high level transition to cause the FIG. 9 circuit to enter an inactive (powered down) state.

The gates of NMOS transistors M78 and M11 are coupled to the gate and drain of transistor M79 and to the drain of transistor M9. The gate and drain of PMOS transistor M12 and the gates of PMOS transistors M16 and M13 are coupled to the drain of transistor M11. The drain of M13 (and optionally also the drain of M16) is coupled to the source of PMOS transistor M15, and the gate and drain of M15 are coupled to op amp 32 to cause bias current "ibiasn" to flow through the channel of M15 to op amp 32. To provide power to op amp 32, supply potential "vcp" (which is 7 volts above the bottom rail potential "pwrn" in a preferred implementation) is asserted thereto.

It is intended that the following claims define the scope of the invention and that structures within the scope of these claims and their equivalents be covered thereby.

What is claimed is:

1. An active pixel sensor cell array, including:
   at least one active pixel sensor cell having a MOSFET reset transistor and sensing circuitry, wherein the sensing circuitry is coupled to the reset transistor and configured to produce at a signal node, in response to incident radiation, a time-dependent signal potential indicative of said radiation, wherein the reset transistor has a gate, a channel coupled to the signal node, and a threshold voltage, the sensing circuitry is configured to reset the signal potential at the signal node to a first potential in response to a full reset potential at the gate of the reset transistor, and the sensing circuitry has a state in which assertion of an XDR reset potential at the gate of the reset transistor following assertion of the full reset potential resets the signal potential at the signal node to a second potential; and
   an XDR reset signal generator including a digital-to-analog converter (DAC) and a level shifting circuit, wherein the DAC is configured to assert a first analog voltage in response to control bits indicative of a predetermined value of the XDR reset potential, wherein the level shifting circuit has an input coupled to receive the first analog voltage from the DAC, an output, and a MOSFET reference transistor whose current density matches that of the reset transistor, wherein the reference transistor is coupled to the output, the level shifting circuit is configured to assert a second analog voltage at the output in response to the first analog voltage, and the second analog voltage is shifted by the said threshold voltage of said reference transistor relative to the first analog voltage.

2. The array of claim 1, wherein the level shifting circuit includes:

an op amp having a noninverting input coupled to receive the first analog voltage from the DAC and an inverting input, wherein said output of the level shifting circuit is an output of the op amp, and said reference transistor has a gate coupled to the output of the level shifting circuit and a channel coupled to the inverting input of the op amp.

3. The array of claim 2, wherein the reset transistor is biased in a first manner during operation, and the reference transistor is biased in a manner matching said first manner during operation.

4. The array of claim 2, wherein each of the reset transistor and the reference transistor is an NMOS transistor, and wherein the second analog voltage is greater than the first analog voltage by an amount equal to said threshold voltage of said reference transistor.

5. The array of claim 2, wherein the cell also includes a row select transistor having a channel coupled to the signal node and a gate coupled to receive a row select signal, and wherein the array also includes:

output circuitry connected to the channel of the row select transistor and configured to generate an output signal indicative of intensity of said radiation, in response to reads of the signal potential at the signal node, said output circuitry including an analog-to digital converter coupled to receive a reference potential and configured to assert output bits indicative of the output signal while operating in response to the reference potential, wherein the DAC of the XDR reset signal generator is coupled to receive the reference potential and is configured to generate the first analog voltage in response to both said reference potential an d said control bits indicative of the predetermined value of the XDR reset potential.

6. The array of claim 2, wherein the output circuitry includes:

a correlate d double sampling circuit connected to the channel of the row select transistor and configured to generate an analog signal indicative of the intensity of said radiation;

signal conditioning circuitry configured to generate a conditioned analog signal in response to the analog signal; and a scan circuit, coupled between the correlated double sampling circuit and the signal conditioning circuitry, and having a state in which it asserts the analog signal to the signal conditioning circuitry and another state in which it does not assert the analog signal to the signal conditioning circuitry, wherein the analog-to-digital converter is configured to assert the output bits indicative of the output signal in response to the conditioned analog signal while operating in response to the reference potential.

7. The array of claim 1, also including:

a multiplexer having a first input coupled to the output of the level shifting circuit so as to receive the XDR reset potential, a second input coupled to receive the full reset potential, and a multiplexer output coupled to the gate of the reset transistor, wherein the multiplexer is configured to connect any selected one of the first input and the second input to the multiplexer output.

8. The array of claim 7, wherein the XDR reset signal generator also includes:

timing and control circuitry coupled to the DAC and the multiplexer, and configured to assert control signals with appropriate timing to said DAC and said multiplexer to cause assertion of a time-varying XDR reset potential from the level shifting circuit, through the multiplexer, to the gate of the reset transistor, following assertion of a full reset potential to said gate of the reset transistor, wherein the time-varying XDR reset potential determines at least one breakpoint of a predetermined piecewise linear response curve for the cell.

9. The array of claim 8, wherein the predetermined piecewise linear response curve has one breakpoint, and the time-varying XDR reset potential determines said breakpoint.

10. The array of claim 8, wherein the predetermined piecewise linear response curve has at least two breakpoints, and the time-varying XDR reset potential determines each of said breakpoints.

11. An XDR reset signal generation circuit for use with an active pixel sensor cell array including at least one active pixel sensor cell having a MOSFET reset transistor and sensing circuitry, wherein the sensing circuitry is coupled to the reset transistor and configured to produce at a signal node, in response to incident radiation, a time-dependent signal potential indicative of said radiation, wherein the reset transistor has a gate, a channel coupled to the signal node, and a threshold voltage, the sensing circuitry is configured to reset the signal potential at the signal node to a first potential in response to a full reset potential at the gate of the reset transistor, and the sensing circuitry has a state in which assertion of an XDR reset potential at the gate of the reset transistor following assertion of the full reset potential resets the signal potential at the signal node to a second potential, said XDR reset generation circuit comprising:

a digital-to-analog converter (DAC) configured to assert a first analog voltage in response to control bits indicative of a predetermined value of the XDR reset potential; and a level shifting circuit having an input coupled to receive the first analog voltage from the DAC, an output, and a MOSFET reference transistor whose current density matches that of the reset transistor, wherein the reference transistor is coupled to the output, the level shifting circuit is configured to assert a second analog voltage at the output in response to the first analog voltage, and the second analog voltage is shifted by the threshold voltage of said reference transistor relative to the first analog voltage.

12. The circuit of claim 11, wherein the level shifting circuit includes:

an op amp having a noninverting input coupled to receive the first analog voltage and an inverting input, wherein said output of the level shifting circuit is an output of the op amp, and said reference transistor has a gate coupled to the output of the level shifting circuit and a channel coupled to the inverting input of the op amp.

13. The circuit of claim 12, wherein the reset transistor is biased in a first manner during operation, and the reference transistor is biased in a manner matching said first manner during operation.

14. The circuit of claim 12, wherein each of the reset transistor and the reference transistor is an NMOS transistor, and wherein the second analog voltage is greater than the first analog voltage by an amount equal to said threshold voltage of said reference transistor.

15. The circuit of claim 11, wherein the XDR reset generation circuit also includes:

timing and control circuitry coupled to the DAC, and configured to assert control signals with appropriate timing to said DAC to cause assertion of a time-varying XDR reset potential from the level shifting circuit, following assertion of a full reset potential to said gate of the reset transistor, wherein the time-varying XDR reset potential determines at least one breakpoint of a predetermined piecewise linear response curve for the cell.

16. The circuit of claim 15, wherein the predetermined piecewise linear response curve has one breakpoint, and the time-varying XDR reset potential determines said breakpoint.

17. The circuit of claim 15, wherein the predetermined piecewise linear response curve has at least two breakpoints, and the time-varying XDR reset potential determines each of said breakpoints.

18. A method for XDR reset signal generation, including the steps of:

(a) determining a piecewise linear response curve, having at least one breakpoint, for an active pixel sensor cell including a reset transistor and sensing circuitry, wherein the sensing circuitry is coupled to the reset transistor and configured to produce at a signal node, in response to incident radiation, a time-dependent signal potential indicative of said radiation, wherein the reset transistor has a gate, a channel coupled to the signal node, and a threshold voltage, the sensing circuitry is configured to reset the signal potential at the signal node to a first potential in response to a full reset potential at the gate of the reset transistor, and the sensing circuitry has a state in which assertion of an XDR reset pulse at the gate of the reset transistor, following assertion of the full reset potential, resets the signal potential at the signal node to a second potential, wherein the piecewise linear response curve has at least one breakpoint and at least one XDR reset potential corresponds to each said breakpoint;

(b) generating control bits indicative of said at least one XDR reset potential;

(c) generating a first analog potential in response to at least a subset of the control bits, by asserting the control bits to a digital-to-analog converter (DAC); and (d) generating a second analog potential by shifting the first analog potential in a level shifting circuit, wherein the level shifting circuit has an input coupled to receive the first analog potential from the DAC, an output, and a reference transistor whose current density matches that of the reset transistor, wherein the reference transistor is coupled to the output, the second analog potential is developed at the output, and the second analog potential is shifted by the threshold voltage of said reference transistor relative to the first analog potential.

19. The method of claim 18, wherein the piecewise linear response curve has at least two breakpoints, step (b) includes the steps of generating a first subset of the control bits indicative of a first XDR reset potential corresponding to a first one of the breakpoints, and generating a second subset of the control bits indicative of a second XDR reset potential corresponding to a second one of the breakpoints, step (c) includes the step of generating the first analog potential in response to the first subset of the control bits, and the method also includes the steps of:

(e) generating a third analog potential in response to the second subset of the control bits, by asserting the second subset of the control bits to the DAC; and (f) generating a fourth analog potential by shifting the third analog potential in the level shifting circuit, wherein the fourth analog potential is shifted by said threshold voltage of said reference transistor relative to the third analog potential.

20. The method of claim 18, wherein the level shifting circuit includes an op amp having a noninverting input coupled to receive the first analog potential and an inverting input, and said reference transistor has a gate coupled to the output of the level shifting circuit and a channel coupled to the inverting input of the op amp, and wherein step (d) includes the step of:

asserting the first analog potential to the noninverting input of the op amp, thereby developing the second analog potential at the output of the level shifting circuit.

21. The method of claim 18, wherein the level shifting circuit includes an op amp having a noninverting input coupled to receive the first analog potential and an inverting input, and said reference transistor has a gate coupled to the output of the level shifting circuit and a channel coupled to the inverting input of the op amp, wherein the reset transistor is biased in a first manner during operation, and wherein step (d) includes the step of:

asserting the first analog potential to the noninverting input of the op amp while biasing the reference transistor in a manner matching said first manner, thereby developing the second analog potential at the output of the level shifting circuit.

* * * * *

UNITED STATES PATENT AND TRADEMARK OFFICE
CERTIFICATE OF CORRECTION

PATENT NO. : 6,348,681 B1
DATED : February 19, 2002
INVENTOR(S) : Willem Johannes Kindt et al.

It is certified that error appears in the above-identified patent and that said Letters Patent is hereby corrected as shown below:

Title page,
Item [57] ABSTRACT, line 1, change "a XDR" to -- an XDR --.

Column 17,
Line 12, change "the said" to -- the --.
Line 52, change "correlate d" to -- correlated --.

Signed and Sealed this

Twenty-first Day of May, 2002

Attest:

Attesting Officer

JAMES E. ROGAN
*Director of the United States Patent and Trademark Office*